United States Patent
Funck et al.

(10) Patent No.: US 8,520,834 B2
(45) Date of Patent: Aug. 27, 2013

(54) METHOD OF DISPLAYING COMPLEX RELATIONSHIPS

(75) Inventors: David Funck, Wheaton, IL (US); Biswajeet Mukherjee, Palatine, IL (US); Edward Kuns, Glen Ellyn, IL (US)

(73) Assignee: Aspect Software, Inc., Chelmsford, MA (US)

( * ) Notice: Subject to any disclaimer, the term of this patent is extended or adjusted under 35 U.S.C. 154(b) by 812 days.

(21) Appl. No.: 12/423,088

(22) Filed: Apr. 14, 2009

(65) Prior Publication Data
US 2010/0260331 A1    Oct. 14, 2010

(51) Int. Cl.
*H04M 3/00* (2006.01)
*H04M 5/00* (2006.01)

(52) U.S. Cl.
USPC ............ 379/266.07; 379/243; 379/265.02; 379/265.11; 379/265.12; 379/266.01

(58) Field of Classification Search
USPC ............ 379/266.07, 265.02, 265.03, 265.05, 379/379/88.01, 243, 242, 265.11, 265.12, 379/266.01, 266.02
See application file for complete search history.

(56) References Cited

U.S. PATENT DOCUMENTS

| | | | |
|---|---|---|---|
| 6,654,458 B1 * | 11/2003 | Saleh | 379/265.03 |
| 6,744,879 B1 * | 6/2004 | Dezonno | 379/265.05 |
| 6,771,764 B1 * | 8/2004 | Dezonno | 379/265.02 |

\* cited by examiner

*Primary Examiner* — Thjuan K Addy
(74) *Attorney, Agent, or Firm* — Husch Blackwell LLP

(57) ABSTRACT

A method and apparatus are provided for presenting structural relationships in an automatic contact distribution system. The method includes the steps of defining a plurality of structural elements within the automatic contact distribution system, selecting a structural element of the automatic contact distribution system as a root element, identifying any related elements of the plurality of elements that together with the selected element affect contact handling within the automatic contact distribution system and displaying the root element and related elements along with an indicia of the relationship between the root element and related elements.

42 Claims, 3 Drawing Sheets

Fig. 3

SCREEN #1

| AGENT IDENTIFIER | COS | PRIMARY AGENT GROUP | SECONDARY AGENT GROUP |
|---|---|---|---|
| 2111 | 1 | 119 | 110 |
| 2112 | 1 | 119 | 120 |
| 2113 | 1 | 120 | 119 |
| 2114 | 2 | 120 | 110 |
| 2115 | 2 | 130 | 119 |
| . | . | . | . |
| . | . | . | . |
| . | . | . | . |
| 2200 | 1 | 119 | 119 |

Fig. 4

SCREEN #2

| AGENT GROUP | AGENTS | ROUTING VECTOR/STEP | AGENT ASSIGNMENT | SKILLSET |
|---|---|---|---|---|
| 119 | 2111, 2112 | A/8, M/2, NI8 | AA12/21 | SK1 |

Fig. 5

SCREEN #3

| AGENT GROUP | AGENTS | ROUTING VECTOR/STEP | AGENT ASSIGNMENT | SKILLSET |
|---|---|---|---|---|
| 100 | 2200, 2201, 2202 | A/9, B/2, F/3 | AA08/2, AA15 | SK2 |
| 102 | 2001, 2106, 2113 | C/3, B/2, G/1 | AA11/10 | SK3 |
| 119 | 2111, 2112 | A/8, M/2, NI8 | AA12/21 | SK1 |

Fig. 6

SCREEN #4

| ROUTING VECTOR | AGENT GROUP | SWITCH | CONTACT CLASS |
|---|---|---|---|
| A | 110, 114, 119 | S1, S4, S10 | C2, C8, C9 |

Fig. 7

SCREEN #5

| COS | AGENT | PRIMARY AGENT GROUP | SECONDARY AGENT GROUP |
|---|---|---|---|
| 1 | 2111 | 119 | 117 |
|  | 2112 | 119 | 120 |
|  | 2113 | 120 | 119 |

Fig. 8

SCREEN #6

| SWITCH | AGENT SEL. APPL | ROUTING VEXTORS | CONTACT CLASSIFICATION |
|---|---|---|---|
| PSTN1 | ASA1, ASA2 | A, D, E | C3, C5, C9 |
| ISW3 | ASA5, ASA8 | A, F | C1, C5 |
| ISW5 | ASA3, ASA7 | B, C | C3, C5, C2 | ced
METHOD OF DISPLAYING COMPLEX RELATIONSHIPS

FIELD OF THE INVENTION

The field of the invention relates to contact centers and, more particularly, to methods of displaying relationships within the contact center.

BACKGROUND OF THE INVENTION

The difficulty of providing information to users within interconnected computer systems is generally known. One or more interconnected computers are typically required whenever the task is too large for a single computer or where specific tasks are handled by different independent systems and the activities of the computers must be coordinated.

Automatic call distributors (ACDs) are an example of such a situation. ACDs are typically used by telemarketers and/or service providers and are typically provided with a host computer that makes and receives calls.

Within the ACD, workforce management, and performance optimization systems (operating within an ACD or otherwise) are examples of the different tasks that may be distributed over a number of hosts. In addition to making and receiving calls, the host of an ACD may also act as a repository of customer records.

In order to reduce telephone costs, telemarketers often locate a number of ACDs of an ACD system near major metropolitan areas. However, during periods of overload calls may be handled through any ACD of the ACD system. As a result, the host or hosts of each ACD must be accessible from any agent station throughout the system.

While the interconnecting of hosts of ACDs works relatively well, the problem of troubleshooting or finding information about call routing is difficult to address. The difficulty often arises because of the need to handle calls in a parallel process. Often the only way of providing information to the user in different databases of the system is to manually access contact routing tables within each different host.

The need to manually access routing tables within different databases is slow and cumbersome. Because of the importance of ACDs and of interconnected computers, a need exists for a better method of providing information to users within such computer system.

SUMMARY

A method and apparatus are provided for presenting structural relationships in an automatic contact distribution system. The method includes the steps of defining a plurality of structural elements within the automatic contact distribution system, selecting a structural element of the automatic contact distribution system as a root element, identifying any related elements of the plurality of elements that together with the selected element affect contact handling within the automatic contact distribution system and displaying the root element and related elements along with an indicia of the relationship between the root element and related elements.

BRIEF DESCRIPTION OF THE DRAWINGS

FIG. 3 depicts a screen that may be used by the system of FIG. 1 to show agent relationships;

FIG. 4 depicts a screen that may be used by the system of FIG. 1 to show a specific group relationship;

FIG. 5 depicts a screen that may be used by the system of FIG. 1 to show system group relationships;

FIG. 6 depicts a screen that may be used by the system of FIG. 1 to show a vector relationship;

FIG. 7 depicts a screen that may be used by the system of FIG. 1 to show class of service relationships; and FIG. 8 depicts a screen that may be used by the system of FIG. 1 to show system routing relationships.

DETAILED DESCRIPTION OF AND ILLUSTRATED EMBODIMENT OF THE INVENTION

Figure 1:
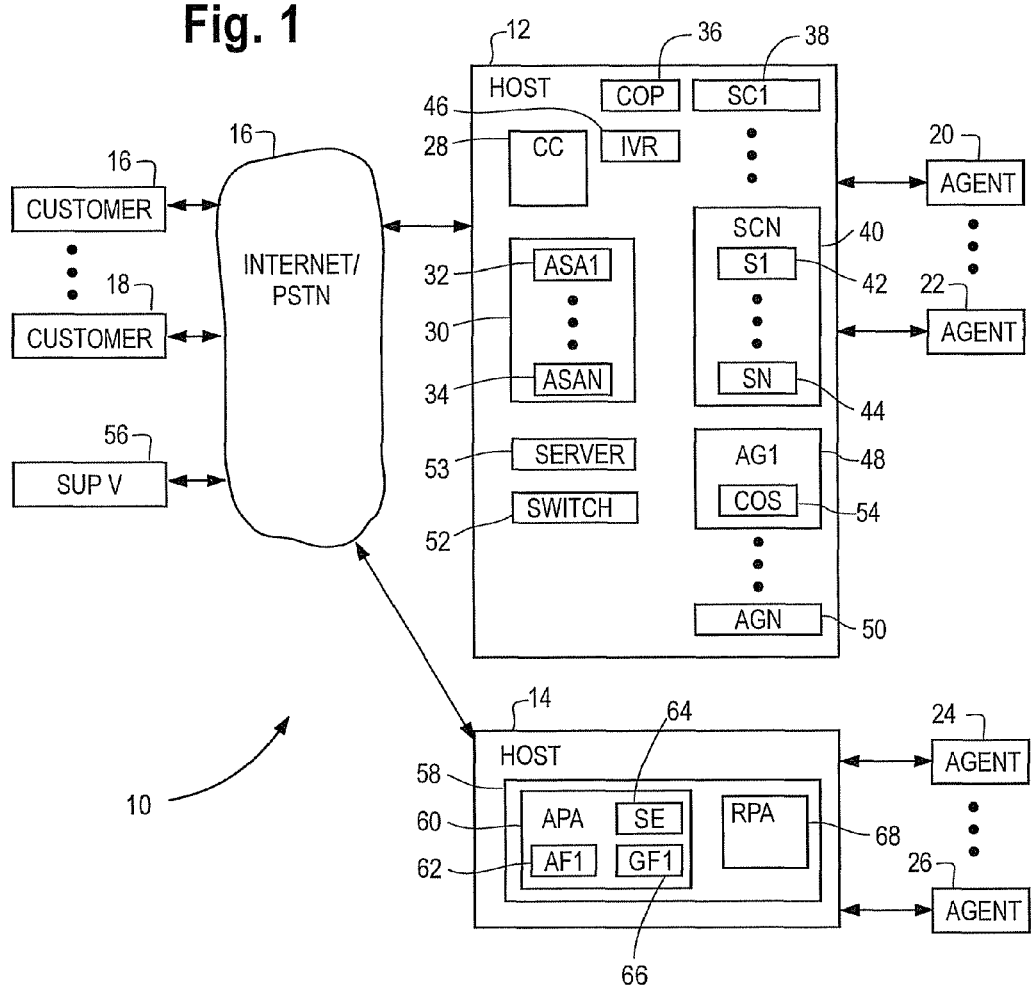
FIG. 1 depicts an automatic contact distribution system shown generally in accordance with an illustrated embodiment of the invention.

FIG. 1 is a block diagram of an automatic contact distribution system 10 shown generally in accordance with an illustrated embodiment of the invention. Included within the automatic contact distribution system 10 may be a number of automatic contact distributors 12, 14.

The automatic contact distributors 12, 14 may receive or initiate contacts with clients 16, 18 under any of a number of different formats (e.g., switched circuit telephone calls, e-mail, chat, VoIP, etc.). In each case, contacts may be initially received by a switch. In the case of switched circuit telephone calls, the calls may be initially received by a telephone switch 52. In the case of Internet contacts, the contacts may be initially received by an Internet switch (e.g., a server) 53.

As contacts are delivered to the contact center system 10 through the Internet or PSTN 16, they are delivered along with call associated information. In the case of a switched circuit call delivered through the PSTN, the contact associated information may be ANI or DNIS information delivered in anticipation of delivery of the call. In the case of e-mail, chat or VoIP, the contact associated information may be a URL or URI of a sender (found in a FROM field) and a destination URL or URI of a contact destination (found in a TO field).

Upon delivery of a contact to a contact center (e.g., 12) of the contact center system 10, the contact associated information may be saved in a contact file that is, in turn, delivered to a contact classification processor 28. Contact classification is important because it allows the contact to be grouped according to the skills required to handle the contact. Contact classification by the classification processor 28, on a first level, may be made based upon contact source and destination information. On another level contact classification may be enhanced through the use of one or more routing vectors or scripts 38, 40.

Included within the contact routing vectors 38, 40 may one or more routing steps 42, 44 that enhance contact classification. For example, at least one of the steps in the case of a switched circuit telephone call may be to route the contact to an interactive voice response unit (IVR) 46. Within the IVR 46, one or more menus may be verbally presented to a caller requesting information as to the purpose of the call. The caller may respond by stating the purpose or activating a key on his/her telephone to further clarify the intent of the call.

To facilitate contact handling within the system 10, agents 20, 22, 24, 26 may be grouped by skill into agent groups 48, 50. Contacts may first be assigned to a group, in general, and then to the first available agent.

Moreover, agents may be assigned to more than one agent group to better utilize the agent's time. For example, an agent may be assigned to one or more primary agent groups because the agent is the most skilled in handling calls to those groups. However, the agent may also be assigned to one or more secondary groups as a backup for the primary agents of that group during periods of overload and also to allow the agent to acquire the skills in handling contacts required for handling contacts directed the secondary group.

In order to expedite transfer of contacts to agents 20, 22, 24, 26, an agent selection processor 30 may receive the classified contacts and assign each classified contact to one or more agent selection applications 32, 34 associated with the an agent group having the required skills. The agent selection application 32, 34 may assign the contact to the longest available agent 20, 22, 24, 26 or may place the contact in a contact queue pending availability of an agent 20, 22, 24, 26.

In general, if element A may route contacts to element B, directly or indirectly, then element A has a routing relationship with element B, and element B has a routing relationship with element A. If routing vector 38 queues a contact to an agent group 48 and agent group 48 contains agents 20, 22, then routing vector 38 has a routing relationship not only with agent group 48 but also with agents 20 and 22. A change to the configuration of agent group 48 (by changing agent membership) can change the routing relationships of routing vector 38.

Agents 20, 22, 24, 26 may interact with the contact centers 12, 14 and receive contacts on any of a number of different conditions defined by a class of service (COS) 52. Each agent may be assigned to exactly one COS, and each COS is comprised of many individual configuration items. On some particular types of ACDs (e.g., the Spectrum ACD) the COS determines whether or not an agent is able to make outcalls. The COS on particular types of ACDs may also determine whether an agent is able to make international out calls, etc.

While COS 52 may define the preferences of the agents 20, 22, 24, 26 in receiving contacts, the COS 52 may also define the manner in which an agent may handle contacts. For example one COS 52 may require an agent to accept a new contact the instant an agent terminates a previous contact. Other COSs may allow an agent to toggle a switch or softkey indicating their willingness to accept a new contact before a new contact is delivered to the agent. Still other COSs may allow an agent to refuse to accept a contact even after that contact has already been delivered to the agent.

Configuration relationships of non-routing elements (e.g., COS) can be important in configuring routing rules and routing relationships. In addition, agent information groups, which are only reporting entities, are useful to have in such systems because reporting categories in routing relationships often overlap. Such systems can only be effectively managed by providing effective systems for monitoring and reporting.

Operating in the background may also be one or more call overflow processors 36. The call overflow processors 36 may monitor the time a contact remains in a queue and may transfer the contact to another agent group or contact center 12, 14 when the time in queue exceeds some time limit.

Connected to the contact center system 10 may be one or more supervisory stations 56. The supervisory stations 56 may be connected to the contact centers 12, 14 through the Internet 16 as shown in FIG. 1 or directly to the individual contact centers 12, 14.

The supervisor stations 56 may be used for any of a number of purposes. For example, the supervisor stations 56 may be used for an of a number of agent supervision functions (e.g., assisting agents, monitoring agent performance, recording announcements, managing emergency recordings, etc.) or for troubleshooting the contact center system 10.

Included within the contact center system 10 is a system modeling application 58 used for modeling complex relationships of structural elements within the contact center 10. As used herein, a structural element is a call handling resource or an attribute of the call handling resource that defines how contacts are handled within the automatic contact distributor.

The modeling system 58 may be located within the contact centers 12, 14 or within one or more of the supervisory stations 56. The modeling system 58 may be structured as a stand-alone, single user application or as a server operating through a website.

In either case, the modeling system 58 may be controlled through a graphical user interface (GUI) that provides real time information about the structural connectors of the contact center system 10 for supervisory and troubleshooting purposes. The modeling system 58 is real time because it operates in real time and relies upon the real time program structure of the system 10 for modeling information.

Figure 2:
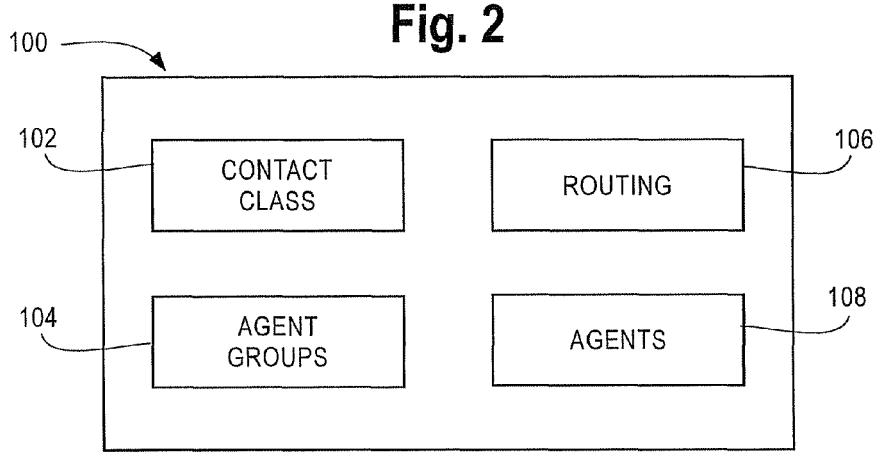
FIG. 2 depicts a modeling selection screen that may be used by the system of FIG. 1.

FIG. 2 depicts a portion of a screen 100 that may appear on a supervisory station 56 for providing access to the modeling system 58. While the modeling system 58 could be accessed through a single softkey or by directly activating the modeling system application 58, the application 58 may also be activated through a set of short cut softkeys 102, 104, 106, 108 labeled CONTACT CLASS 102, AGENT GROUPS 104, ROUTING 106 AND AGENTS 108 shown in FIG. 2.

To access the modeling system 58, a user may select a particular functional area of the contact center system 10 by activating the appropriate softkey 102, 104, 106, 108. For example, if the user should activate the AGENTS softkey 108, then an agent modeling application 60 within the modeling system 58 (operating under control of an agent features list 62) may collect agent information from each of the contact centers 12, 14. An agent features list 62 defines structural features and relationships of the selected element.

In this case, a feature of the AGENTS softkey 108 within the agent features list 62 may require the collection of identifiers of each of the agents registered within the system 10 as well as any structural feature directly related to the agents (e.g., COS, primary group assignment, secondary group assignment, etc.). In this case, a search engine 64 may receive the features list 62, search for and retrieve any agent files 48, 50. The search engine 64 may present the user with the screen (screen #1) shown in FIG. 3.

As indicated by the header in screen #1, the four digit numbers are agent identifiers, the single digit number is the COS of the associated agent and the three digit numbers are identifiers of primary and secondary group assignments of the associated agent.

In general, the information provided by the modeling system 58 may present a selected call processing element on the upper left as the root element for the selection. Elements with routing or configuration relationships to the selected element may be shown in the next column to the right. (In this case, a COS is a configuration item of an agent, so the agent has a configuration relationship with COS.) A routing relationship between two elements means that one element (for example, an agent group) can route a call to another element (e.g., agent), or may have a call routed to it by that element. Additional elements with routing or configuration relationships to the selected element may be located and displayed in later columns.

In screen #1, each of elements (i.e., the one, two and three digit numbers) may be hyperlinks to other structural elements of the contact system 10. For example, if the user should activate the hyperlink 119 (i.e., primary agent group 119), then the agent modeling application 60 would collect and display structural elements associated with operation of the primary agent group 119.

Selection of agent group 119 may be useful in the event that group 119 were to be overloaded. By selecting agent group 119, a user could easily review the number and identity of any agents assigned to the group 119.

In this case, the agent modeling application 60 may retrieve a group features list 66 specifying the features and structural elements to be retrieved and displayed in conjunction with the identified primary group 119. The structural elements of the features list 66 may include identifiers of any agents 20, 22, 24, 26 assigned to the agent group 119, identifiers of any agent assignment applications 32, 34 or routing vectors 38, 40 that route calls to the group 119 as well as a skill set required by the agent group.

The agent modeling application 60 may search the agent lists for agents assigned to the group 119. The agent modeling application 60 may also transfer the group identifier 119 to a route modeling application 68. In this case, a features list of the route modeling application 68 for a specific agent group 119 may require the collection of any routing information associated with the group 119.

The route modeling applications 68 may search any agent selection applications 32, 34 and routing vectors 40, 48 to identify any transfer steps (break points) that cause transfer of a contact to the group 119. The collected information may be displayed to the user as shown in screen #2 (FIG. 4).

In this case, screen #2 shows that a call routed to agent group 119 will be routed to, logged in and available to agents who are members of agent group 119, including agents 2111 and 2112. Screen #2 also shows that routing vector A, step 8, routing vector M, step 2 and routing vector N, step 18 routes contacts to group 119 and that agent assignment application 12 (AA12), step 21 routes contacts to agent group 119.

Screen #2 shows (in a very simplistic example) that skill set 1 (SK1) is required for agent group 119. However, skill assignments can be established with a high degree of customization, assigning individual agents different levels of user-defined skill categories. As such, the skill set of screen #2 may be presented under a number of different formats dependent upon the context.

Once the supervisor has reviewed the data on screen #2, the supervisor may become concerned that too many routing vectors are routing contacts to agent group 119 and may wish to look at other agent groups. In order to do this, the supervisor may place his/her cursor over the heading (hyperlink) labeled AGENT GROUP in screen #2 (or the softkey labeled AGENT GROUPS 104 in FIG. 2) and activate the hyperlink. By doing so, the supervisor may be presented with the screen #3 including all agent groups as shown in FIG. 5.

Alternatively, the supervisor may suspect that routing vector A is routing too many (or too few) contacts to group 119. To look at routing vector A, the supervisor may click on the entry (hyperlink) A/8 in either screen #2 or #3. In response, a screen #4 may be displayed as shown below in FIG. 6.

In this example, the supervisor may observe that routing vector A routes contacts to groups 110, 114 in addition to group 119 or overflows contacts to other automatic contact distributors 12, 14. The supervisor may also observe that routing vector A receives contacts from switches S1, S4 and S10 and that contact classifications C2, C8 and C9 are routed from switches S1, S4 and S10 to routing vector A.

If the supervisor is still concerned about routing vector A, the supervisor may click on the routing vector identifier (hyperlink) A in screen #4. Upon clicking on the vector identifier A, the supervisor may be taken to a vector editor where the supervisor can directly review and/or modify the steps of vector A (38, 40).

As another example, the user may select the hyperlink COS 1 in screen #1. Selection of a COS may be made by a supervisor in response to agent complaints about their ability to handle contacts through an agent terminal. Selection of a particular COS may be used by a supervisor to understand the capabilities assigned to a terminal being used by an agent.

In this case, the COS is a structural attribute of an agent 20, 22, 24, 26. In this case, the agent modeling application 60 may retrieve a group function list 66 that identifies any agent that receives the selected COS as being relevant to the selected COS. However, COS also affects how contacts are delivered to agent groups and, therefore, the group function list 66 may also require that agents identified with the selected COS also be shown with identifiers of the primary and secondary agent groups assigned to the agent. In response, the data may be displayed as shown in screen #5 (FIG. 7).

After viewing screen #5, the supervisor may determine that one or more agents have the wrong COS. After viewing screen #5, the supervisor may determine that one or more agents should be moved to a different COS. In order to modify these COS assignments, the supervisor may click on the heading (hyperlink) COS.

In another example, if a supervisor were to desire to look at routing in general, then the supervisor may activate the softkey 106 labeled ROUTING. If the supervisor should activate this softkey 106, the supervisor may be taken to a screen #6 as shown below in FIG. 8.

As shown in screen #6, the first column may show a list of switches 52, 53 present within the system 10. At least some of the switches (e.g., PSTN1 (switch 52 in FIG. 1)) may receive switched circuit calls through the PSTN. Other switches (e.g., ISW3, ISW5 (switch 53 in FIG. 1)) may receive contacts through the Internet.

Shown in a second column from the left is a list of destination agent selection applications 32, 34 (e.g., ASA1, ASA2, ASA5, ASA8, ASA3, ASA7) to which the respective switches PSTN1, ISW3, ISW5 may route contacts. Shown in the third column is a list of routing vectors A, B, C, D, E, F that the switches 52, 53 also route to either directly or through the agent selection applications of column 2. Shown in the far right column is a list of call classifications that cause contacts to be routed as shown.

It should also be noted that direct and indirect relationships may be displayed selectively. For example, if A routes to B, which is configured by C, then the relationship between A and C is indirect. In this case, the relationship of C to A may be displayed in a column of indirect relationships along with the direct relationships in other columns. The column heading may indicate the relationship in any of a number of ways (e.g., A routes to B, B is routed to/from A, A is configured by B, B is a member of A, etc.).

A specific embodiment of method and apparatus for displaying complex relationships has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of presenting structural relationships in an automatic contact distribution system comprising:
   defining a plurality of structural elements within the automatic contact distribution system;
   selecting a structural element of the automatic contact distribution system as a root element;
   identifying any related elements of the plurality of structural elements that together with the selected element affect contact handling within the automatic contact distribution system; and
   displaying on a user station the root element and related elements along with an indicia of the relationship between the root element and related elements including displaying at least one of the displayed elements as a hyperlink to other elements of the plurality of structural elements such that activation of the hyperlink initiates display of other elements of the plurality of structural elements associated with operation of the activated hyperlinked element.

2. The method of presenting structural relationships as in claim 1 wherein the plurality of structural elements further comprise at least two selected from the group consisting of agents, agent groups, agent class of service, routing vectors, switches, IVRs, agent selection applications, overflow vectors contact classification applications.

3. The method of presenting structural relationships as in claim 1 wherein the indicia further comprises identifiers selected from the group consisting of agents, primary agent groups, secondary agent groups, routing vectors, locations within routing vectors, IVRs, agent selection applications, overflow vectors, contact classification applications.

4. The method of presenting structural relationships as in claim 1 further comprising displaying an element that is indirectly related to the root element.

5. The method of presenting structural relationships as in claim 1 further comprising displaying a configuration of the root element and displaying at least one heading as a hyperlinks which when activated by a user initiates display of other elements of the plurality of structural elements related to the heading.

6. The method of presenting structural relationships as in claim 1 further comprising defining the structural relationship based upon contact flow.

7. The method of presenting structural relationships as in claim 6 wherein the contact flow further comprises contact flow into or out of an application and the indicia an identifier of the application.

8. The method of presenting structural relationships as in claim 6 wherein the contact flow further comprises contact flow into or out of a switch and the indicia an identifier of the switch.

9. The method of presenting structural relationships as in claim 6 wherein the indicia further comprises a source identifier of contacts routed to the selected element.

10. The method of presenting structural relationships as in claim 6 wherein the indicia further comprises a destination identifier of contacts routed from the selected element.

11. The method of presenting structural relationships as in claim 1 further comprising defining the structural relationship based upon contact classification.

12. The method of presenting structural relationships as in claim 11 wherein the structural relationship further comprises contact groups assigned to the contact classification.

13. The method of presenting structural relationships as in claim 12 wherein the structural relationship further comprises agents assigned to an agent group.

14. The method of presenting structural relationships as in claim 12 wherein the structural relationship further comprises a class of service under which agents handle contacts.

15. An apparatus for presenting structural relationships in an automatic contact distribution system comprising:
   a plurality of structural elements within the automatic contact distribution system;
   means for selecting a structural element of the automatic contact distribution system as a root element;
   means for identifying any related elements of the plurality of structural elements that together with the selected element affect contact handling within the automatic contact distribution system; and
   means for displaying the root element and related elements along with an indicia of the relationship between the root element and related elements including displaying at least one of the displayed elements as a hyperlink to other elements of the plurality of structural elements such that activation of the hyperlink initiates display of other elements of the plurality of structural elements associated with operation of the activated hyperlinked element.

16. The apparatus for presenting structural relationships as in claim 15 wherein the plurality of structural elements further comprise at least two selected from the group consisting of agents, agent groups, agent class of service, routing vectors, switches, IVRs, agent selection applications, overflow vectors and contact classification applications.

17. The apparatus for presenting structural relationships as in claim 15 wherein the indicia further comprises identifiers selected from the group consisting of agents, primary agent groups, secondary agent groups, routing vectors, locations within routing vectors, IVRs, agent selection applications, overflow vectors, contact classification applications.

18. The apparatus for presenting structural relationships as in claim 15 wherein the related elements further comprises an element indirectly related to the root element.

19. The apparatus for presenting structural relationships as in claim 15 wherein the related element further comprising a configuration of the root element.

20. The apparatus for presenting structural relationships as in claim 15 further comprising means for defining the structural relationship based upon contact flow.

21. The apparatus for presenting structural relationships as in claim 20 wherein the contact flow further comprises contact flow into or out of an application and the indicia an identifier of the application.

22. The apparatus for presenting structural relationships as in claim 20 wherein the contact flow further comprises contact flow into or out of a switch and the indicia an identifier of the switch.

23. The apparatus for presenting structural relationships as in claim 20 wherein the indicia further comprises a source identifier of contacts routed to the selected element.

24. The apparatus for presenting structural relationships as in claim 20 wherein the indicia further comprises a destination identifier of contacts routed from the selected element.

25. The apparatus for presenting structural relationships as in claim 15 further comprising defining the structural relationship based upon contact classification.

26. The apparatus for presenting structural relationships as in claim 25 wherein the structural relationship further comprises contact groups assigned to the contact classification.

27. The apparatus for presenting structural relationships as in claim 26 wherein the structural relationship further comprises agents assigned to an agent group.

28. The apparatus for presenting structural relationships as in claim 26 wherein the structural relationship further comprises a class of service under which agents handle contacts.

29. An apparatus for presenting structural relationships in an automatic contact distribution system comprising:
- a plurality of structural elements within the automatic contact distribution system;
- a graphical user interface for selecting a structural element of the automatic contact distribution system as a root element;
- a search engine that identifies any related elements of the plurality of structural elements that together with the selected element affect contact handling within the automatic contact distribution system; and
- a display that displays the root element and related elements along with an indicia of the relationship between the root element and related elements wherein at least one of the displayed elements is a hyperlink to other elements of the plurality of elements such that activation of the hyperlink by a user initiates display of other elements of the plurality of structural elements associated with operation of the activated hyperlink element.

30. The apparatus for presenting structural relationships as in claim 29 wherein the plurality of structural elements further comprise at least two selected from the group consisting of agents, agent groups, agent class of service, routing vectors, switches, IVRs, agent selection applications, overflow vectors and contact classification applications.

31. The apparatus for presenting structural relationships as in claim 29 wherein the indicia further comprises identifiers selected from the group consisting of agents, primary agent groups, secondary agent groups, routing vectors, locations within routing vectors, IVRs, agent selection applications, overflow vectors, contact classification applications.

32. The apparatus for presenting structural relationships as in claim 29 wherein the related elements further comprises an element indirectly related to the root element.

33. The apparatus for presenting structural relationships as in claim 29 wherein the related element further comprising a configuration of the root element.

34. The apparatus for presenting structural relationships as in claim 29 further comprising a features list that defines the structural relationship based upon contact flow.

35. The apparatus for presenting structural relationships as in claim 34 wherein the contact flow further comprises contact flow into or out of an application and the indicia an identifier of the application.

36. The apparatus for presenting structural relationships as in claim 34 wherein the contact flow further comprises contact flow into or out of a switch and the indicia an identifier of the switch.

37. The apparatus for presenting structural relationships as in claim 34 wherein the indicia further comprises a source identifier of contacts routed to the selected element.

38. The apparatus for presenting structural relationships as in claim 34 wherein the indicia further comprises a destination identifier of contacts routed from the selected element.

39. The apparatus for presenting structural relationships as in claim 29 further comprising defining the structural relationship based upon contact classification.

40. The apparatus for presenting structural relationships as in claim 39 wherein the structural relationship further comprises contact groups assigned to the contact classification.

41. The apparatus for presenting structural relationships as in claim 40 wherein the structural relationship further comprises agents assigned to an agent group.

42. The apparatus for presenting structural relationships as in claim 40 wherein the structural relationship further comprises a class of service under which agents handle contacts.

* * * * *